US009015576B2

(12) United States Patent
Dougherty et al.

(10) Patent No.: US 9,015,576 B2
(45) Date of Patent: Apr. 21, 2015

(54) INFORMED PARTITIONING OF DATA IN A MARKUP-BASED DOCUMENT

(75) Inventors: Michael Dougherty, Issaquah, WA (US); Joe Bertolami, Bellevue, WA (US); Adam Smith, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 13/108,560

(22) Filed: May 16, 2011

(65) Prior Publication Data

US 2012/0297292 A1 Nov. 22, 2012

(51) Int. Cl.
*G06F 17/22* (2006.01)
*G06F 17/27* (2006.01)

(52) U.S. Cl.
CPC ........ *G06F 17/2229* (2013.01); *G06F 17/2247* (2013.01); *G06F 17/2258* (2013.01); *G06F 17/272* (2013.01)

(58) Field of Classification Search
USPC .................................................. 715/234, 238
See application file for complete search history.

(56) References Cited

U.S. PATENT DOCUMENTS

| | | | | |
|---|---|---|---|---|
| 6,058,250 | A * | 5/2000 | Harwood et al. | 709/227 |
| 6,119,135 | A * | 9/2000 | Helfman | 715/206 |
| 6,687,485 | B2 | 2/2004 | Hopkins et al. | |
| 6,832,215 | B2 | 12/2004 | Gauthier et al. | |
| 6,938,101 | B2 * | 8/2005 | Hayes et al. | 710/5 |
| 7,000,008 | B2 | 2/2006 | Bautista-Lloyd et al. | |
| 7,165,215 | B2 * | 1/2007 | Tunning | 715/234 |
| 7,173,604 | B2 * | 2/2007 | Marvit et al. | 345/156 |
| 7,337,397 | B2 * | 2/2008 | Kanbayashi | 715/202 |
| 7,456,993 | B2 * | 11/2008 | Walker, Jr. | 358/1.18 |
| 7,517,098 | B2 * | 4/2009 | Savilampi | 353/121 |
| 7,549,154 | B2 * | 6/2009 | Rhoten et al. | 719/321 |
| 7,634,780 | B2 | 12/2009 | Rhoten et al. | |
| 7,779,348 | B2 | 8/2010 | Doatmas et al. | |
| 7,992,187 | B2 * | 8/2011 | Chiao | 725/153 |
| 8,266,139 | B2 * | 9/2012 | Morris et al. | 707/722 |
| 8,595,633 | B2 * | 11/2013 | Celik et al. | 715/760 |
| 2002/0162120 | A1 * | 10/2002 | Mitchell | 725/135 |
| 2003/0140279 | A1 * | 7/2003 | Szucs et al. | 714/31 |
| 2004/0055018 | A1 * | 3/2004 | Stone | 725/113 |

(Continued)

OTHER PUBLICATIONS

Psiloc Wireless Presenter Description; Jan. 3, 2007; Psiloc.com; p. 1.*

(Continued)

*Primary Examiner* — Andrew Dyer
(74) *Attorney, Agent, or Firm* — Gregg Wisdom; Kate Drakos; Micky Minhas (57) ABSTRACT

One or more techniques and/or systems are provided for displaying a first portion of a markup language document on a first device and displaying a second portion of the markup language document on a second device for interaction with the first portion (e.g., allowing a smart phone to control a video playing on a separate monitor). A markup language document can be created by a developer, where first and second portions of the document are delineated by a remote device tag. The remote device tag can be used to instruct a first device parsing the document to send the second portion to a second (e.g., remote) device. The first portion of the document can be rendered by the first device, and displayed on a display coupled with the first device; and a rendered version of the second portion can be displayed by a display coupled with second device.

20 Claims, 8 Drawing Sheets

(56) References Cited

U.S. PATENT DOCUMENTS

| | | |
|---|---|---|
| 2005/0027823 A1* | 2/2005 | Rana ............................ 709/219 |
| 2005/0101314 A1* | 5/2005 | Levi .............................. 455/423 |
| 2005/0223228 A1* | 10/2005 | Ogawa et al. ................. 713/168 |
| 2005/0273609 A1* | 12/2005 | Eronen ......................... 713/171 |
| 2005/0289156 A1 | 12/2005 | Maryka et al. |
| 2006/0064472 A1 | 3/2006 | Mirho |
| 2006/0079214 A1* | 4/2006 | Mertama et al. ........... 455/414.1 |
| 2006/0130075 A1* | 6/2006 | Rhoten et al. ................. 719/328 |
| 2007/0078876 A1* | 4/2007 | Hayashi et al. ............... 707/101 |
| 2007/0079233 A1* | 4/2007 | Hayler ......................... 715/513 |
| 2007/0239981 A1* | 10/2007 | Lessing ........................ 713/164 |
| 2007/0242035 A1* | 10/2007 | Tsao ............................ 345/156 |
| 2008/0104516 A1* | 5/2008 | Lee .............................. 715/732 |
| 2008/0155396 A1 | 6/2008 | Dubinko et al. |
| 2008/0307299 A1 | 12/2008 | Marchant et al. |
| 2010/0182341 A1* | 7/2010 | Lee et al. ..................... 345/635 |
| 2010/0211865 A1 | 8/2010 | Fanning et al. |
| 2010/0268581 A1* | 10/2010 | Biancardini et al. ......... 705/14.4 |
| 2010/0282044 A1 | 11/2010 | Delorme |
| 2011/0102444 A1* | 5/2011 | Matsumoto ................... 345/531 |
| 2011/0138060 A1* | 6/2011 | Purkayastha et al. ......... 709/227 |

OTHER PUBLICATIONS

Psiloc Wireless Presenter User Guide; Jan. 5, 2007; Psiloc.com; pp. 1-6.*

The Microsoft Office Open XML Formats, Preview for Developers; Jun. 2005; Microsoft; pp. 1-30.*

Thomason et al.; CSS Tip: Create Your Own HTML Tags; May 2004; NetMechanic; pp. 1-3.*

Editing Renderer Profiles; Feb. 13, 2010; Serviio.org; pp. 1-2.*

Kan, et al., "New wave panel", Retrieved at <<http://www.waveprotocol.org/protocol/design-proposals/new-wave-panel-undercurrent>>, Oct. 19, 2010, pp. 9.

"YUI 2: Pagination", Retrieved at <<http://developer.yahoo.com/yui/paginator/>>, Retrieved Date: Jan. 21, 2011, pp. 6.

Int. Search Report cited in PCT Application No. PCT/US2012/036849 dated Nov. 28, 2012, 9 pgs.

* cited by examiner

INFORMED PARTITIONING OF DATA IN A MARKUP-BASED DOCUMENT

BACKGROUND

In a computing environment, a markup language can be used by an author to create a document that is displayed based at least in part on text provided in the document and accompanying annotations that generally describe how the text is to be displayed. For example, text characters may be included in the document, along with annotations comprising formatting instructions, presentation instructions, procedural instructions, and/or descriptive markings. In this example, the text and annotations can be used to create a viewable or processable version of the document, which may comprise text, images, media, links, and other viewable components. Markup language can be used for a variety of document types, such as in word processing documents (e.g., using a presentational markup), macro or subroutine documents (e.g., using procedural markup), and web-based documents (e.g., using descriptive markup).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

It can be appreciated that in some instances it may be desirable to display a first portion of a markup language document on a first device and a second portion of the markup language document on a second device. For example, it may be desirable to display interactive content (e.g., a video) on a monitor, while presenting one or more controls for the content (e.g., play, stop, pause, rewind, etc.) on a smart phone. In this manner, a user can view content corresponding to the first portion of a markup language document on a first device and a control corresponding to the second portion of the markup language document on a second device, where second/first portion can interact with the first/second portion.

This can be problematic to achieve in some scenarios, however, such as where a web browser attempts to render a first portion of a web-based document hosted on a first device and second portion of the web-based document hosted on a second device. For example, current web browsers typically require various portions of a markup language web-based document to coexist within in a same web browser, either as sub regions within a top-level document (e.g., as frames), or as separate top-level windows (e.g., "popup(s)"). However, inefficiencies can arise when attempting to make such portions coexist, and additional computing and/or networking resources may resultantly be unnecessarily consumed. Additionally, it may not be possible for a single markup language document to provide content for different devices. For example, conventional techniques generally require respective markup language documents for different devices, even where the content is related. It can be appreciated that this requires additional development and other resources at least because there may be substantial overlap between documents that have to nonetheless be created separately.

Accordingly, one or more techniques and/or systems are disclosed that allow a first portion of a markup language document to be displayed on a first device and a second portion of the markup language document to be displayed on a second device, where the first/second portion can interact with the second/first portion. In one embodiment for displaying a first portion of a markup language document on a first device and displaying a second portion of the markup language document on a second device for interaction with the first portion, the markup language document is parsed using the first device. Further, the first portion of the markup language document, indentified at least in part by the parsing, can be rendered using the first device, where the rendering can be used for displaying the first portion on a display coupled with the first device. Additionally, the second portion of the markup language document can be sent to the second device, using a remote device tag in the markup language document identified, at least in part, by the parsing. The remote device tag can delineate the second portion, which can be sent for displaying by the second device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for using merely one document to display portions of the document on two different devices. For example, instead of needing to write two separate documents in order to display desired content on two separate devices, a web-page developer can merely write a single document, comprising a remote device tag, to partition the document's contents. In this way, one portion of the document's contents can be displayed on one device, and another portion of the contents can be displayed on another device, for example. By partitioning the contents of just one document, for example, it may be easier and more efficient for the web-developer to create content that allows one device to interact with content on another device (e.g., like a remote control).

Figure 1:
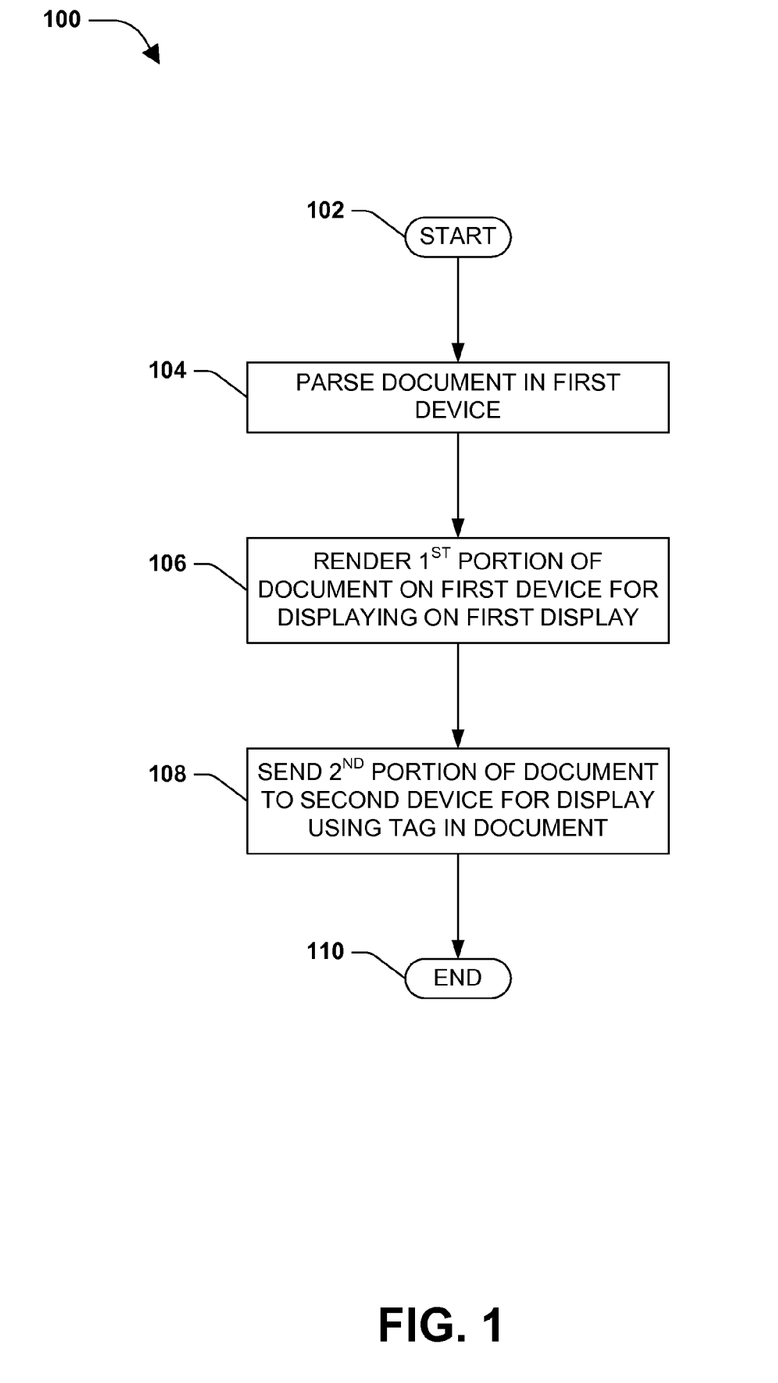
FIG. 1 is a flow diagram illustrating an exemplary method for displaying a first portion of a markup language document on a first device and displaying a second portion of the markup language document on a second device for interaction with the first portion.

FIG. 1 is a flow diagram illustrating an exemplary method 100 for displaying a first portion of a markup language document on a first device and displaying a second portion of the markup language document on a second device for interaction with the first portion. The exemplary method 100 begins at 102 and involves parsing the markup language document using the first device, at 104. For example, parsing a document can comprise reading annotations, markup content, formatting information, etc. of a document to perform instructions comprised in the document for rendering a displayable format of the document. As an illustrative example, a web browser engine can be used to read a web-based document in order to render one or more images of one or more portions of a web-page, which may then be displayed in the web-browser.

At 106, the first portion of the markup language document is rendered, based at least in part upon the parsing, for displaying on a display that is coupled with the first device. For example, a rendered first portion of the markup language document can comprise one or more rasterized or vector-based images, which may be sent to a display coupled with the first device. As an illustrative example, a computer, such as a console type component (e.g., gaming console, Internet-based component), can be connected to a television or monitor, for example, for viewing web-based content. In this example, the computer, comprising the first device, can render portions of the markup language document and send images of the rendered content to the television. The television can display the images comprising the first portion of the document on its screen for viewing by a user, for example.

At 108, the second portion of the markup language document is sent to the second device, using a remote device tag in the markup language document. The second portion is sent so that is can ultimately be displayed by the second device. For example, the second device can be communicatively connected to the first device (e.g., using a network connection), and the second portion can be sent by the first device to the second device so that the second device may render if necessary and display the second portion. As an illustrative example, a console-based computer may be connected to the Internet. In an embodiment, the console-based computer may be wired or wirelessly connected to a router connected with the Internet. The second device may comprise a handheld computing device (e.g., a smart-phone), for example, which can also be connected to the Internet (e.g., using a wireless connection, cellular connection, etc.). Further, in this example, the remote device tag in the markup language document may identify the second device to where the second content is to be sent, or may merely identify that the second content is to be sent to a remote device connected with and/or within range of the first device.

Having sent the second portion of the markup language document to the second device, the exemplary method 100 ends at 110.

Figure 2:
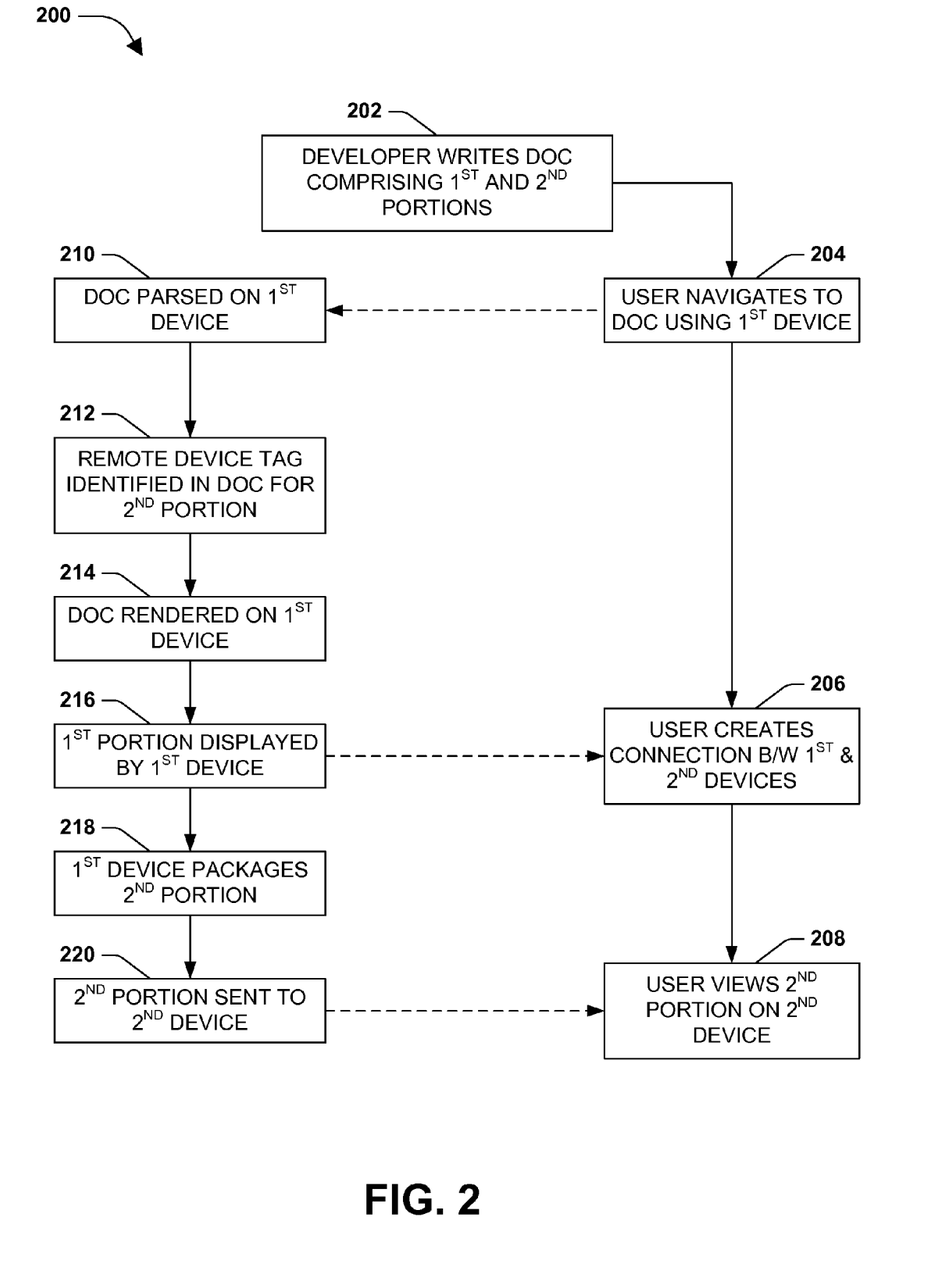
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented. At 202, a developer writes a markup language document comprising a first portion and a second portion, which are delineated by a remote device tag. For example, a game developer may desire to utilize a connected touch screen device to control content for the game; or a developer of a website that plays video content may wish to utilize a connected device to control the video content; or the developer may wish to send a portion of a webpage to an off-screen device, such as to share a confidential message.

In one embodiment, the developer can write merely one document in a markup language that comprises content for two different displays. In an embodiment, the markup language may comprise hypertext markup language (HTML). For example, the remote device tag in the document can comprise an HTML tag with instructions to direct content marked by the tag to be sent to a second device (e.g., off-screen, and/or remote device), while the non-tagged content (e.g., remaining content in the document) can be further processed by the first device. In one embodiment, the document author may write an HTML document and mark up one or more frames for remote display, for example, using the remote device tag.

Figure 4A:
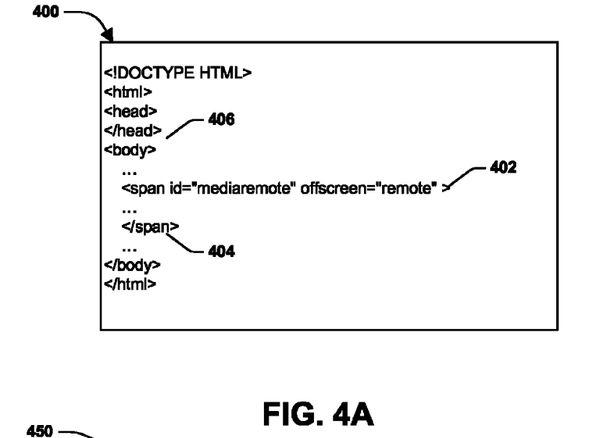
FIG. 4A illustrates an example embodiment of a markup document comprising a first and second portion.

As an illustrative example, FIG. 4A illustrates an example embodiment of a markup document 400 comprising a first and second portion. For example, in the example document 400, an HTML tag 402 in the document informs a browser reading the document to render a <span> element 404 on a remote control device. Further, in this example embodiment 400, a first portion 406, comprising the head and body elements, of the document 400 can be rendered and displayed on a local display coupled with the device comprising the browser, where the browser may be reading the document 400. As an example, the span element 404 may comprise an iframe that comprises JavaScript code for rendering an image of a remote control, which can be forwarded to a remote device comprising a display. As an illustrative example, the first portion 406 may provide for content to be displayed on a television monitor, while the second portion 404 may provide one or more controls for the content to be displayed on a smart phone. In this example, a user may thus be able to watch a video on their television while controlling the video (e.g., play, pause, rewind, etc.) using their smart phone.

Returning to FIG. 2, at 204, using a first device, a user may navigate to the document written by the developer. For example, the first device may comprise a computer that utilizes a browser to navigate, such as over the Internet, to a web-document authored by the developer. As an illustrative example, the user may navigate to a website that allows the user view movies, where a movie can be viewed on a large attached display and a connected handheld device may be used as a type of remote control for interacting with the movie. In one embodiment, the markup language document can be received (e.g., downloaded) by the first device from a remote server (e.g., hosting the document).

At 210, the document can be parsed by the first device. For example, the browser resident on the first device can comprise a browser engine used to read the markup language document. A markup language document can comprise portions of text and annotations, as well as links to images, and other media, for example, that are displayed on a rendered representation of the page. Further, the markup language document can comprise "markups" and programming code that may be used to format the rendered portions of the document, and/or run a program on the page (e.g., using a scripting code). Examples of markup language used to write documents, such as for display on the Internet, for example, can comprise: hypertext markup language (HTML), extensible markup language (XML), and/or derivatives or related languages thereof. In one embodiment, the browser engine can read the markup language document to identify the elements of the document.

At 212, a remote device tag is identified in the document delineating the second portion of the document. For example, as described in FIG. 4A above, the browser engine reading the example document 400 can identify the remote device tag 402 delineating the second portion, comprising the span 404. In one embodiment, the second device can be identified using the remote device tag in the markup language document. As illustrated in FIG. 4A, the remote device tag 402 identifies the device "mediaremote" as the intended second device. In this example, the "mediaremote" may merely comprise a remote device that is connected in some way to the first device (e.g., over a remote or local network, a router, using a near-field radio connection, etc.).

In one embodiment, the "id" of the second device in the remote device tag may comprise a universal resource identifier (URI), a network address, an internet protocol (IP) address, a Bluetooth ID, or some other locator that identifies an intended second device. In one embodiment, the second device may be identified in the vicinity of the first device, such that the user of the second device can view both a display connected to the first device and a display coupled with the second device at a same time (e.g. substantially concurrently). In this embodiment, for example, the second device may be used as a type of controller for the first portion displayed by the first device, where the user can see the first and second portions at the same time.

Figure 4B:
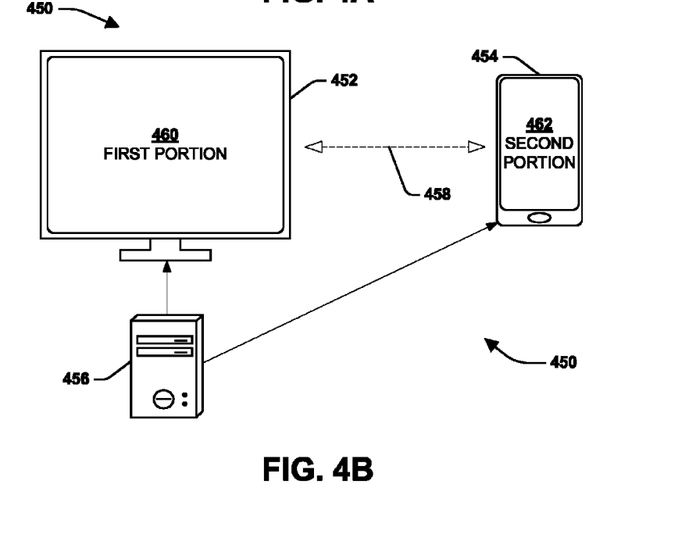
FIG. 4B illustrates an example embodiment of an environment where one or more or the techniques described herein may be implemented.

As an illustrative example, FIG. 4B illustrates an example embodiment 450 of an environment where one or more or the techniques described herein may be implemented. In this example 450, a first device 456 can be connected with a first display 452, which may comprise a large screen monitor (e.g., television, computer monitor, etc.); and the second device 454 may comprise a small handheld computing device (e.g., a smart-phone, handheld console, etc.) with its own integrated (or coupled) display. Further, in this embodiment, a user may be standing in the vicinity of the first display 452 holding the second device 454, such that they can view both the first display 452 and the display of the second device 454.

In one embodiment, identifying the remote device tag can also comprises identifying the second portion, and consequently identifying the first portion. In this embodiment, for example, the first portion can comprise the portions of the document that are not the second portion, delineated by the remote device tag. The second portion of the document can comprise a section of the document that is intended to be viewed on a (display of a) second device (e.g., remote device), for example, separately from the first portion of the document, which is intended to be viewed on the first device, or rather a display operatively coupled thereto. Further, for example, the second portion may be viewed merely on the second device and the first portion may merely be viewed on the first device (e.g., although other arrangements, configurations, etc. are contemplated).

Returning to FIG. 2, at 214, the document can be rendered on the first device. As described above, the document may be read by the browser engine and rendered, where rendering can comprise creating a displayable layout of the document using the markup language in the document. For example, the marked-up content of the document (e.g., HTML, XML, XHTML, or other components) can be read and combined with formatting information (e.g., cascading style sheets (CSS), extensible stylesheet language (XSL), or some other stylesheet language) to generate/render a displayable layout version of the document, to be displayed to a user.

In one embodiment, the rendering can comprise rendering of both the first and second portions of the document by the first device. In another embodiment, merely the first portion may be rendered by the first device. For example, the remote device tag may comprise instructions (e.g., either explicitly, or using a library element) that tell the browser engine what to do with the second portion of the document.

In one embodiment, the remote device tag may comprise instructions that tell the first device to render a displayable layout of the second portion, for sending to the second device. In another embodiment, the remote tag may inform the first device to merely send the second portion, for example, as a markup language portion, to the second device. In another embodiment, the remote device tag may initiate a request to a remote server (e.g., a cloud-based server comprising content) to send instructions (e.g., markup language or scripting code, and/or a viewable layout) to the second device.

At 216 in the example embodiment 200, the first portion of the document is displayed by the first device. For example, as illustrated in FIG. 4B, the first device 456 may be coupled with a first display 452, such as locally, and the rendered first portion 460 can be displayed on the first display 452. It will be appreciated that the first display is not limited to being locally coupled with the first device. For example, the first and second displays may both be remotely coupled with the first device, such as over a network connection (e.g., the Internet, an intranet, or a remote network system). In the example embodiment 450 of FIG. 4, the first display may comprise a monitor or television connected by wire, or a display that connects remotely to the first device, such as over the Internet. Further, the first display may connect to the first device using a wireless local network connection (e.g., WiFi, Bluetooth, near-field radio, etc.).

Returning to FIG. 2 at 206, the user can view the first portion displayed by the first device, and may decide to create or initiate a connection between the first device and a second device. As an example, the rendered first portion of the document displayed to the user may notify the user that they can interact with the first portion using a second device. As an illustrative example, the document may comprise a webpage where the first portion of the webpage comprises interesting content, such as a movie, game, or interactive website. Further, in this example, the webpage can inform the user to connect a second device to use as a type of interactive control for the content.

Often, interaction with web-based content on a television or monitor using typical television remote controllers or console controllers can be frustrating. For example, web-pages are usually optimized to be interacted with using typical input controls (e.g., a keyboard and mouse). Further, some web-pages may wish to develop customized controls, such as for interactive media, gaming, etc. In one embodiment, the second portion can be customized by the document author to provide interactive controls particular to the document contents (e.g., of the first portion). Therefore, when the user sees a message to connect a second device, for example, they may choose to connect a handheld computing device (e.g., smart-phone) to interact with the first portion of the document so that the second portion that is ultimately provided to a user is provided in a manner that is suitable for the handheld computing device (e.g., smartphone).

It will be appreciated that the connections and interaction of the first and second devices are not limited to the embodiments described. It is anticipated that those skilled in the art may devise alternate embodiments for connections and interactions between the first and second devices to share content from a same document. For example, the second portion may comprise particular information that is intended to merely be viewed by the user of the second device (e.g., an online trivia game sending questions to one or more second devices). Further, as another example, the first and second portions (e.g., and third, fourth, etc.) may comprise different parts of the document, intended to be viewed by different connected devices (e.g., to allow multiple participants to control respective characters concurrently displayed on a monitor, television, etc.).

In one aspect, the user may connect the second device with the first device upon being provided an indication to do so, as described above. In an alternate embodiment, in this aspect, the user may already have connected the second device to a network. In this embodiment, for example, the first device may direct the second portion to the second device using an identifier for the network, such as using a URI for the network, for example.

Additionally, as another embodiment, both the first and second devices may be connected to a network (e.g., locally or remotely) and the first device may merely send the second portion to a "closest" connected device. For example, the network service (e.g., a cloud-based service) may be able to identify one or more devices that are proximate to the first device. In this example, the network service may find a closest device (e.g., or indicate a choice of devices to the user) with which to connect to send the second content.

At 218 in the example embodiment 200, the first device can package the second portion, and send the second portion to the second device, at 220. For example, if the second portion comprises a rendered version, such as a lay-out view of an image, the rendered version of the second portion can be packaged and sent to the second device. As another example, if the second portion comprises markup language, or some code, it can be packaged and sent to the second device (e.g., for rendering by the second device). As another example, if the second portion comprises a request to a remote server to provide content to the second device, the request can be packaged and sent to the remote server, which in turn can send the second portion to the second device (e.g., as a rendered version, and/or as code to be rendered).

In one aspect, as described above, the first and second devices may be communicatively connected in a variety of ways, for example, thereby providing a variety of ways to send the second portion to the second device (e.g., and communicate back and forth). In one embodiment, a wireless connection (e.g., WiFi, near-field radio, Bluetooth, etc.) between the first device and the second device may be used to communicate, which can comprise sending the second portion, and/or receiving input into the second device, for example. In one embodiment, a local network connection between the first device and the second device may be used for communication (e.g., a local area network, either wired or wireless, etc.). In one embodiment, a remote network connection (e.g., Internet, intranet, wide area network, etc.) between the first device and the second device may be used to communicate. In one embodiment, a wired connection (e.g., a direct wire, such as a USB, network cable, etc.) between the first device and the second device may be used for communication.

At 208, the second device can receive the second portion, and display it on a coupled display for viewing by the user. In one embodiment, the second device may comprise an incorporated display (second display) which may be used to display the second portion. In another embodiment, the second device may be coupled with a separate display (second display), such as a monitor or television to display the second portion. Further, in one embodiment, the second device may merely display the rendered version sent by the first device, such as in a lay-out view, for example. In another embodiment (e.g., where the first device does not render the second portion), the second device may locally render the second portion, comprising markup language and/or script code, for example, to generate a lay-out view for display on the second display.

In one aspect, the second portion sent to the second device can represent content with which the user may wish to interact. For example, the user interacting with the content provided by the second portion may affect the first portion displayed on the first display. As an illustrative example, a video game can provide interactive controls in the second portion that allows the user to use the second device as a game controller (e.g., to input commands). As another illustrative example, a console device may be connected to a television for viewing media, such as TV shows and movies. In this example, the second portion may comprise a TV remote control-type device that allows the user to control watching of the media content (e.g., play, pause, fast forward, etc.).

Figure 3:
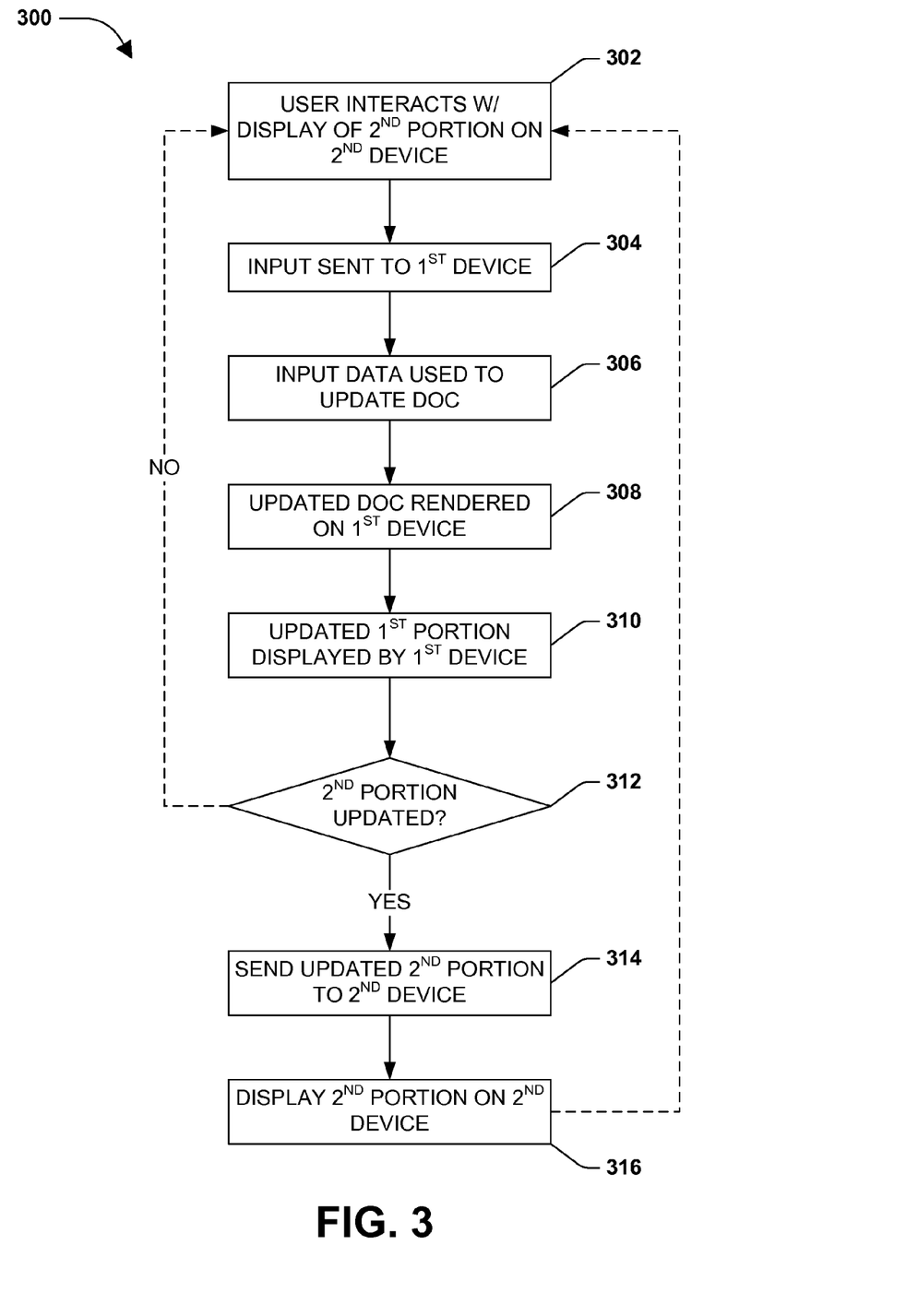
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. At 302, a user can interact with displayed content, comprising a second portion of a markup language document, displayed on a display associated with a second device. For example, if the second content comprises some sort of controller for first content corresponding to a first portion of the markup language document displayed on a display associated with a first device, the user may activate a virtual button on the displayed content, intending for the activation to translate to a corresponding action for the first content. As an illustrative example, the first content may comprise a video, and the second content may comprise a pause button, which, when pressed by the user, can pause the video content displayed by the first display.

At 304, an indication of the input interaction by the user can be sent from the second device to the first device. In one embodiment, the indication of the input interaction can be sent using one or more communication connections between the first and second devices described above. The indication of an input interaction with the second portion of the markup language document can be received at the first device, from the second device.

In one embodiment, the indication of an input interaction with the second portion received from the second device can comprise one or more coordinates of the input interaction with an image displayed by the second device. For example, the second portion may comprise a lay-out of elements comprising controls, which may be respectively identified by coordinates in the lay-out (e.g., pixel grid coordinates). In this example, when the user activates an element, such as by clicking, pressing, swiping, or some other action intended to activate the element (e.g., and thereby activating an underlying control), one or more coordinates comprising the users action can be used for the input interaction indication (e.g., sent to the first device).

In another embodiment, the indication of an input interaction with the second portion received from the second device can comprise one or more vectors for the input interaction. For example, moving an element, or interacting with an element in a particular direction may generate a vector comprising a direction and/or speed for the movement interaction (e.g., causing a character displayed on the first display to run faster, jump higher, etc.).

In another embodiment, the input interaction may activate a control element that generates (e.g., or continues) a code (e.g., script code or markup language code) comprised in the second portion displayed on the second device. For example, where the second device renders markup language code comprising the second portion, as described above, the input interaction may generate an action in the underlying code, portions of which can be sent to the first device as the indication of the input interaction. As an illustrative example, the second portion may be configured to receive data input from the user, such as alphanumeric characters (e.g., text). In this example, when the user inputs the characters using the second device, the input characters can be sent as markup language code (e.g., describing the characters and display characteristics) to the first device.

At 306, input data, comprising the indication of the input interaction, can be used to update one or more portions of the markup language document. In one embodiment, the indication of the input interaction can be used to update the rendered first portion on the first device at 308, which can then be displayed on the display operatively associated with the first device at 310. For example, if the second portion comprises a game controller for a game being displayed on the first display, the input data may change an element of the game (e.g., move a game character). As another example, the input data may be used to activate content in the first portion, such as to activate an element in the first portion to retrieve content (e.g., using the controller displayed on the second display to activate a control on the first display).

In one embodiment, the indication of input interaction received by the first device may also (or alternately) update the second portion of the document. For example, the users input to the second device may change how the second portion is displayed for the second device. In one embodiment, where the markup language code comprising the second portion resides locally on the second device, for example, the second device may render an updated version of the second portion locally.

In another embodiment, at 312, if the indication of the interaction input received at the first device calls for the second portion to be updated (YES at 312), the second portion may be updated at the first device and the updated second portion can be sent to the second device at 314. For example, the first device may use the received indication of the interaction input to render an updated lay-out view of the second portion, or may use the indication of the interaction input to update a request to a remote server. In this example, the updated lay-out view of the second portion can be sent to the second device, or the updated request can be sent to the remote server to send an updated second portion to the second device.

At 316, the updated second portion of the document can be displayed on the display operatively associated with the second device, such as on the second display, and the first device may wait for another interaction with the display of the second portion on the second device, at 302. If the second portion of the document is not updated by the indication of the input interaction at the first device (NO at 312), the first device may wait for another interaction with the display of the second portion on the second device, at 302. In this way, for example, the user may interact with the second portion of the markup language document displayed by the second device to interact with at least the first portion displayed by the first device.

A system may be devised for partitioning portions of a document, for example, such that different portions can respectively be displayed by different devices. For example, a developer writing a markup language-based document (e.g., a web document) can merely write one document, where a first portion of the document can be rendered for display on a first device, and a second portion can be rendered for display on a second connected device (e.g., connected by a network such as the Internet). In this way, for example, the developer has a simplified way to provide a user with an ability to use the second device to interact with the second portion to control elements of the first portion of the document displayed by the first device (e.g., without having to write separate markup documents for respective devices).

Figure 5:
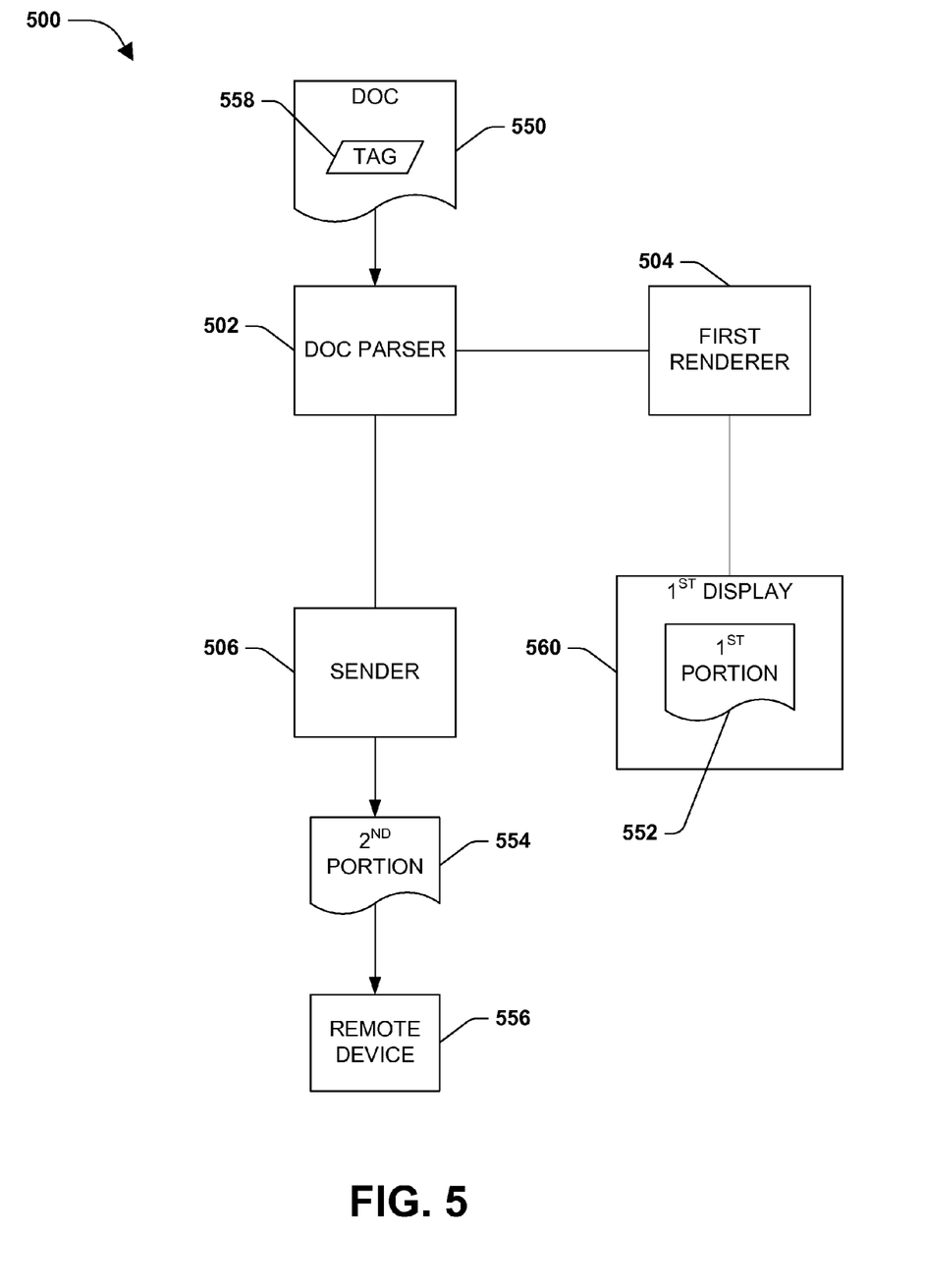
FIG. 5 is a component diagram illustrating an exemplary system for displaying a first portion of a markup language document on a first device and displaying a second portion of the markup language document on a second device for interaction with the first portion.

FIG. 5 is a component diagram illustrating an exemplary system 500 for displaying a first portion of a markup language document on a first device and displaying a second portion of the markup language document on a second device for interaction with the first portion. A document parsing component 502 is configured to parse the markup language document 550 to identify a remote device tag 558. For example, the markup language document 550 may be received by the exemplary system 500, such as by downloading or browsing to a site comprising the document, and the document parsing component 502 can read the markup language to identify the remote device tag 558. Further, in one embodiment, in identifying the remote device tag 558, the document parsing component 502 can identify the first portion 552 and second portion 554 of the document, for example, as the remote device tag 558 can comprise a type of marker that delineates the first portion 552 and second portion 554 of the document.

A first rendering component 504 is operably coupled with the document parsing component 502. The first rendering component 504 is configured to render the first portion 552 of the markup language document 550 for displaying on a first display 560, based at least in part upon the parsing by the document parsing component 502. For example, the remote device tag 558 identified by the document parsing component 502 may delineate the first portion 552 from the second portion 554. In this example, the first rendering component 504 can then render the identified first portion creating a rendered version (e.g., a lay-out view comprising images, text, animation, video, other media, etc.) from the markup language in the first portion, which may be displayed by the first display 560. In one embodiment, the first display may be communicatively coupled (e.g., wired or wirelessly) with the exemplary system 500.

A sending component 506 is operably coupled with the document parsing component 502. The sending component 506 is configured to send the second portion 554 of the markup language document 550 to a remote device 556. The second portion 554 is identified by the remote device tag 558 in the markup language document 550. For example, the document parsing component 502 can identify the remote device tag 558 when parsing the markup language document 550, and it may be used to delineate the second portion 554 from the first portion 552. As an illustrative example, the remote device tag 558 may be inserted by a developer of the document 550 to identify markup language code that can be used to send content to the remote device 556 for display.

Figure 6:
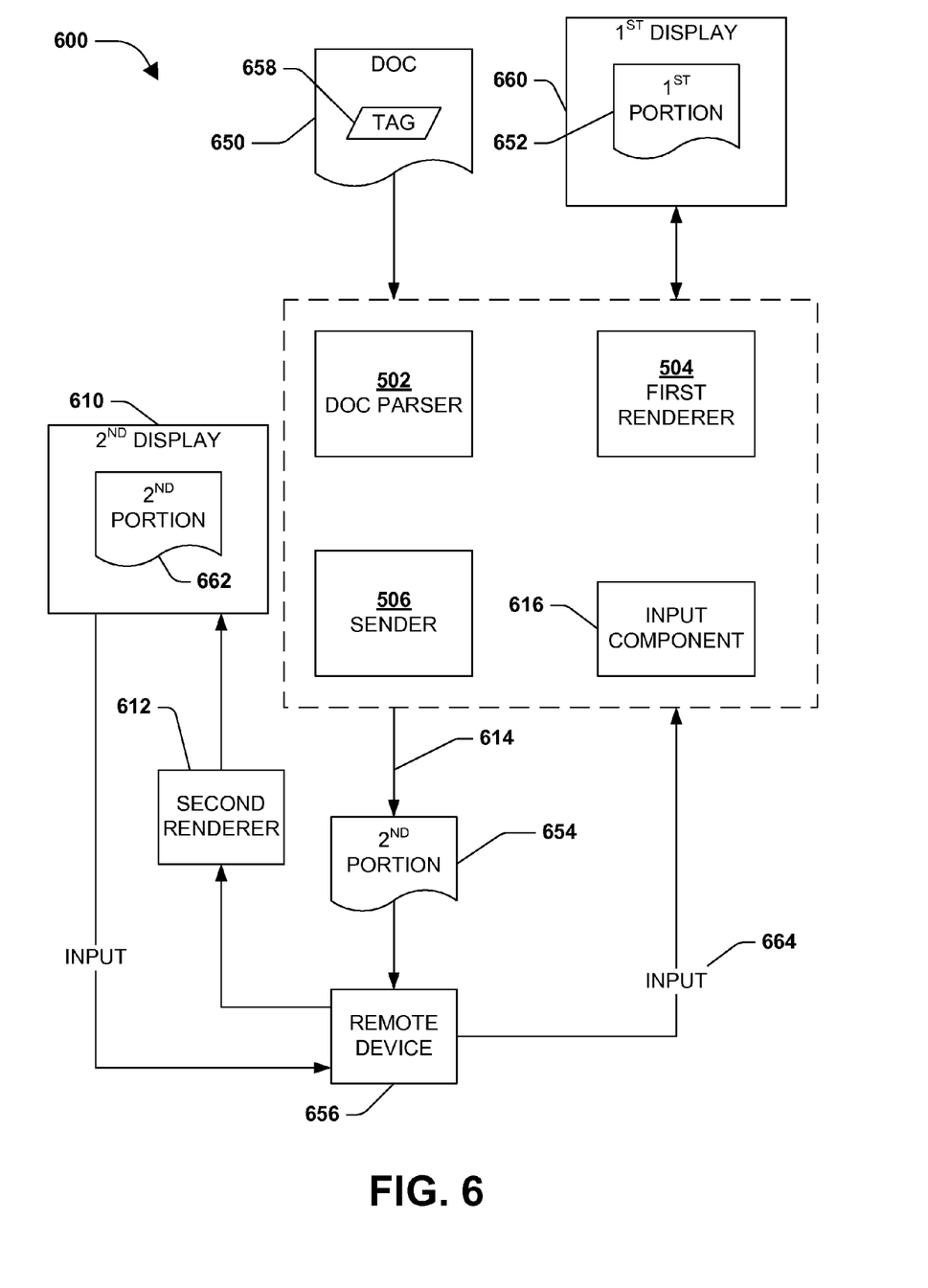
FIG. 6 is a component diagram illustrating an example embodiment where one or more systems described herein may be implemented.

FIG. 6 is a component diagram illustrating an example embodiment 600 where one or more systems described herein may be implemented. In this example, an extension of FIG. 5 is provided and thus description of elements, components, etc. described with respect to FIG. 5 may not be repeated for simplicity. A markup language document 650, comprising a remote device tag 658, may comprise a hypertext markup language (HTML) based document, an extensible markup language (XML) based document, and/or an application programming interface (API) associated with a web-based document. For example, the markup language document 650 can be a single document, such as authored in one or more markup languages, and it may comprise portions that are delineated by the remote device tag 658.

A second display 610 can display a rendering of a second portion 654 of the document (e.g., the displayed second portion 662) on a remote device 656 based at least in part upon a parsed portion of the markup language document 650. As an example, the remote device 656 may comprise a computing device that can receive the second portion 654, and is coupled with the second display 610, and/or where the second display 610 is integral with the remote device 656. As an illustrative example, the remote device 656 may be a handheld console, smart-phone, or a type of media player comprising an integrated display screen (e.g. touch sensitive for input) wherein a rendered representation of the second content 662 can be displayed.

A second document rendering component 612 is configured to render the second portion 654 of the markup language document 650 for the remote device 656 (e.g., where the second portion 654 is not received by the second device in a rendered version). In one embodiment, the second portion 654 sent to the remote device can comprise markup language code identified in the markup language document 650 by the remote device tag 658. In this embodiment, for example, the second rendering component 612 can create a rendered version (e.g., a lay-out view) of the second portion 654 for displaying on the second display 610. In one embodiment, the second portion 654, comprising markup language code, may be sent from the sending component 506. In another embodiment, the second portion 654, comprising markup language code, may be sent from a remote server (not shown) at a request of the sending component 506. As an illustrative example, in this embodiment, markup language code is sent to the second device, which renders the code locally to create a viewable image of the second portion.

In one embodiment, the second portion 654 sent to the remote device 656 can comprise an image-based lay-out version based at least in part upon a rendered second portion of the markup language document. For example, the first rendering component 504 may render both the first and second portions, identified in the markup language document 650 by the remote device tag 658, thereby creating a rendered view of the second portion. In this example, the rendered version of the second portion can be sent to the remote device 656 for display by the second display 610. As an illustrative example, in this embodiment, merely a viewable image of the second portion is sent to the remote device for display, where the image is a rendering of the second portion.

The example embodiment 600 may comprise a connection 614 between the sending component 506 and the remote device 656, for example, used to send the second portion 654. In one embodiment, the connection can comprise a local wireless connection (e.g., WiFi, near-field radio, etc.), a local network connection (e.g., wired or wireless), a remote cloud-based connection (e.g., over the Internet or an intranet), and/or a remote network connection (e.g., a wide area network). In one embodiment, the connection may also be used to receive input from the remote device 656, such as to an input component 616.

The input component 616 can be configured to receive an indication 664 of an input interaction with the displayed second portion 662 from the remote device 656. For example, a user of the second device 656 may interact with the displayed second portion 662 by selecting a displayed control element in the displayed second portion 662. For example, a touch-screen input may be used to activate a graphical user interface (GUI) element comprised within the displayed second portion 662. In this example, the indication 664 of the user input can be sent to input component 616 from the remote device 656.

Further, the input component 616 can update at least a portion of the rendered markup language document 650 in response to the indication 664 received from the remote device 656. In one embodiment, the update can comprise an update to at least a portion of a first portion 652 of the document displayed on a first display 660, and/or an update to at least a portion of the displayed second portion 662 of the markup language document.

The input provided by the user of the remote device 656 may cause the first portion 652 of the document 650 to be updated, for example, where the second portion is used as a sort of remote controller for the first portion 652 of the document 650. In this example, an updated version of the first portion can be rendered, such as by the first rendering component 504, and displayed by the first display 660. In one embodiment, the input provided by the user of the remote device 656 may cause the second portion of the document 650 to be updated, for example, by interacting with a GUI element on the second display that changes the element. In this example, an updated version of the second portion can be rendered, such as by the first rendering component 504 or the second rendering component 612, and displayed by the second display 610.

Figure 7:
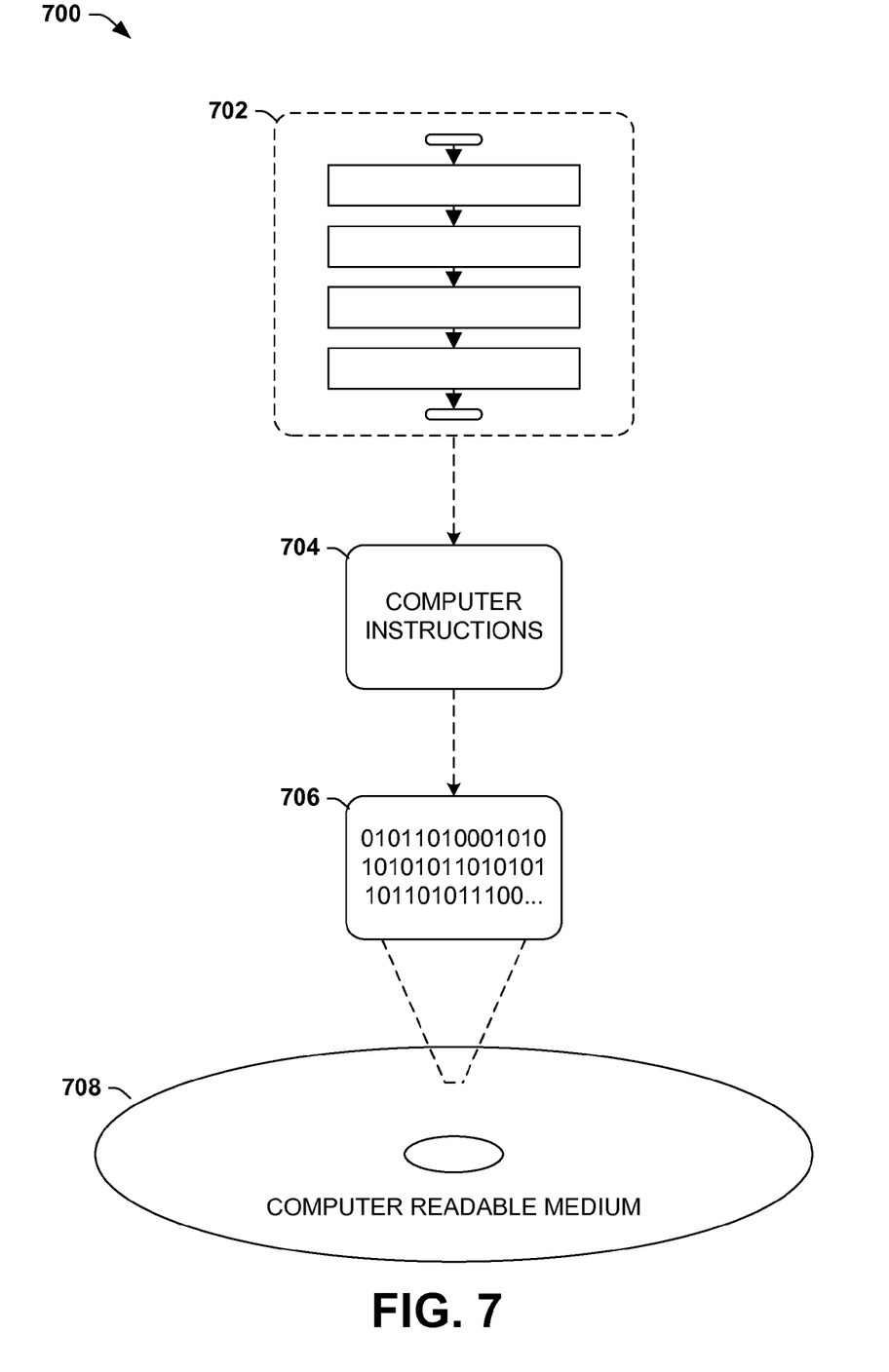
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
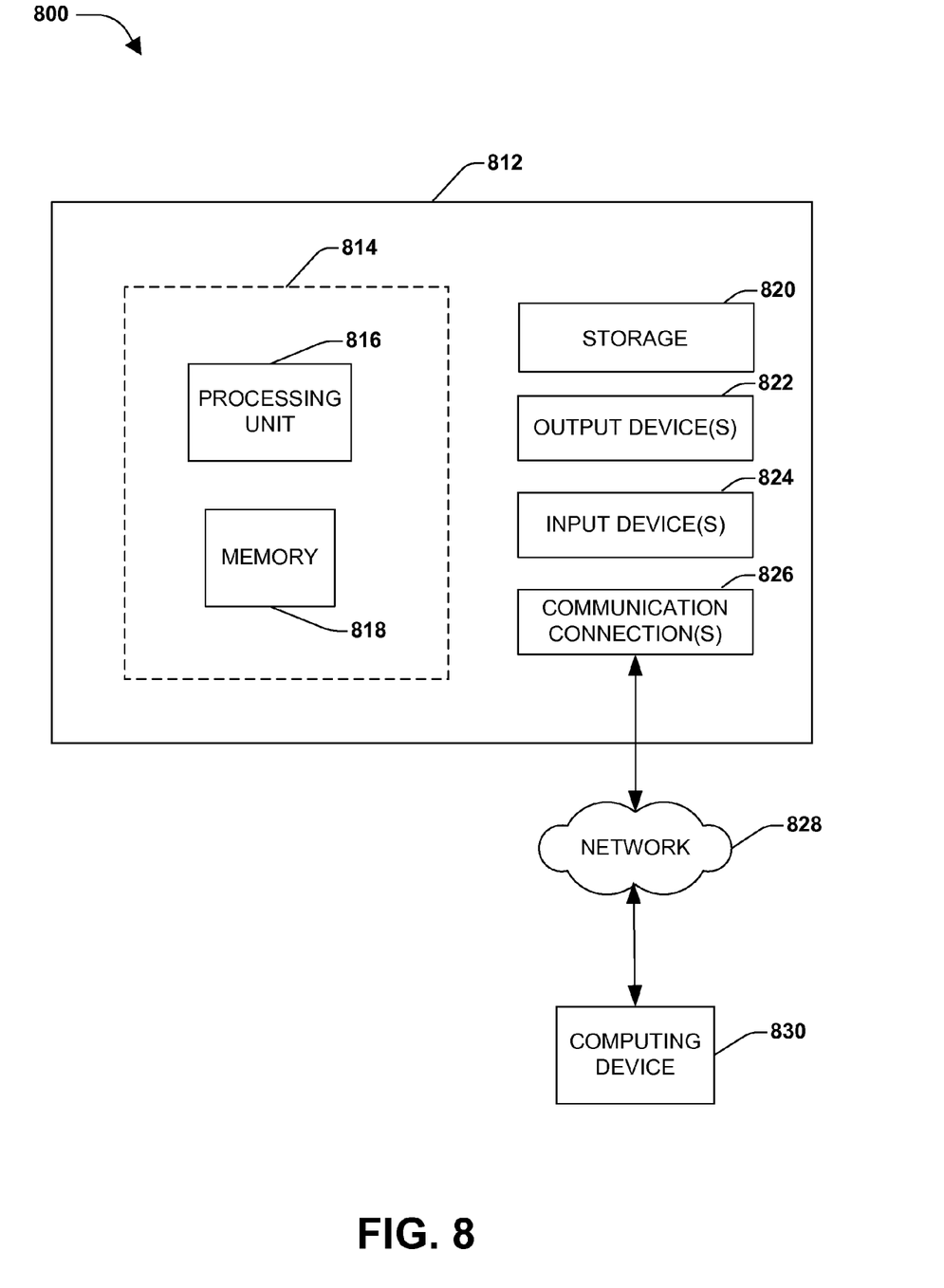
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices, multiprocessor systems, consumer electronics, mini computers, mainframe computers, distributed computing environments that include any of the above systems or devices, and the like. In an embodiment, mobile devices may comprise mobile phones, Personal Digital Assistants (PDAs), media players, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
receiving a markup language document that comprises a first portion associated with a first device, a second portion associated with a second device, and a remote device tag, the markup language document comprising a hypertext markup language (HTML) document;
identifying the first portion, the first portion not comprising all of the markup language document;
identifying the second portion based upon the remote device tag, the remote device tag comprising instructions for displaying content corresponding to the second portion on the second device but not comprising instructions for displaying any of the content corresponding to the second portion on the first device and not comprising instructions for displaying second content corresponding to the first portion on the second device, the remote device tag identifying the second device as an intended second device, the second portion not comprising all of the markup language document and different than the first portion, the first portion not comprising the second portion, the second portion not comprising the first portion;
rendering, for display by the first device, the first portion but not the second portion and not one or more other portions of the markup language document not comprising the first portion; and
sending, to the second device for display by the second device, the second portion but not the first portion and not one or more other portions of the markup language document not comprising the second portion.

2. The method of claim 1, the sending the second portion comprising sending a rendered view of the second portion of the markup language document.

3. The method of claim 1, the sending the second portion comprising sending markup language code comprising the second portion for rendering by the second device.

4. The method of claim 1, the second device comprising a handheld device.

5. The method of claim 1, comprising receiving an indication of an input interaction with the second portion of the markup language document from the second device.

6. The method of claim 5, comprising updating a rendering of one or more portions of the markup language document based on the indication.

7. The method of claim 5, comprising one or more of:
updating the rendering of the first portion, based on the input interaction with the second portion; or
sending an updated second portion to the second device, based on the input interaction with the second portion.

8. The method of claim 5, the receiving an indication of an input interaction with the second portion of the markup language document from the second device comprising receiving one or more coordinates corresponding to interaction with a first image displayed by the second device.

9. The method of claim 1, the remote device tag comprising an HTML tag.

10. The method of claim 1, comprising identifying the second device such that at least some of a display of the first device and at least some of a display of the second device are concurrently viewable to a user of the second device.

11. The method of claim 1, the sending the second portion comprising sending the second portion to the second device using one or more of:
a wireless connection between the first device and the second device;
a local network connection between the first device and the second device;
a remote network connection between the first device and the second device; or
a wired connection between the first device and the second device.

12. The method of claim 1, the receiving comprising receiving the markup language document from a remote server.

13. A system, comprising:
one or more processing units; and
memory comprising instructions that when executed by at least some of the one or more processing units perform a method comprising:
receiving a markup language document that comprises a first portion associated with a first device, a second portion associated with a second device, and a remote device tag, the markup language document comprising a hypertext markup language (HTML) document;

identifying the first portion;

identifying the second portion based upon the remote device tag, the remote device tag comprising instructions for displaying content corresponding to the second portion on the second device but not comprising instructions for displaying any of the content corresponding to the second portion on the first device and not comprising instructions for displaying second content corresponding to the first portion on the second device, the second portion not comprising all of the markup language document and different than the first portion;

rendering the first portion for display by the first device; and sending, to the second device for display by the second device, the second portion but not the first portion and not one or more other portions of the markup language document not comprising the second portion.

14. The system of claim 13, the sending the second portion comprising sending the second portion from the first device to the second device.

15. The system of claim 13, the method comprising rendering the second portion of the markup language document for the second device.

16. The system of claim 13, the first device comprising a console-based computer.

17. The system of claim 13, the second device comprising a handheld device.

18. The system of claim 13, the method comprising providing for a connection between the first device and the second device, the connection comprising one or more of:
   a local wireless connection;
   a local network connection;
   a remote cloud-based connection; or
   a remote network connection.

19. The system of claim 13, the method comprising:
   receiving an indication of an input interaction with the second portion from the second device; and
   updating at least a portion of the markup language document in response to the indication, the updating comprising one or more of:
      updating at least a portion of the first portion of the markup language document; or
      updating at least a portion of the second portion of the markup language document.

20. A computer readable memory comprising instructions that when executed perform a method, comprising:
   receiving a markup language document that comprises a first portion associated with a first device, a second portion associated with a second device, and a remote device tag, the markup language document comprising a hypertext markup language (HTML) document;
   identifying the first portion, the first portion not comprising all of the markup language document;
   identifying the second portion based upon the remote device tag, the remote device tag indicative of the association of the second portion with the second device but not comprising instructions for displaying content corresponding to the second portion on the first device and not comprising instructions for displaying second content corresponding to the first portion on the second device, the remote device tag identifying the second device as an intended second device, the second portion not comprising all of the markup language document and different than the first portion, the first portion not comprising the second portion, the second portion not comprising the first portion;
   rendering, for display by the first device, the first portion but not the second portion and not one or more other portions of the markup language document not comprising the first portion; and
   sending the second portion to the second device for display by the second device.

* * * * *